April 17, 1934.   G. A. M. LAMBLIN-PARENT   1,955,599
MOTOR VEHICLE HEADLIGHT
Filed July 30, 1931   4 Sheets-Sheet 1

Inventor
GUSTAVE A. M. LAMBLIN-PARENT
BY
Attorney

April 17, 1934. G. A. M. LAMBLIN-PARENT 1,955,599
MOTOR VEHICLE HEADLIGHT
Filed July 30, 1931 4 Sheets-Sheet 2

Inventor
GUSTAVE A. M. LAMBLIN-PARENT
BY
Attorneys

April 17, 1934.  G. A. M. LAMBLIN-PARENT  1,955,599

MOTOR VEHICLE HEADLIGHT

Filed July 30, 1931  4 Sheets-Sheet 3

Inventor
GUSTAVE A. M. LAMBLIN-PARENT

BY

Attorney

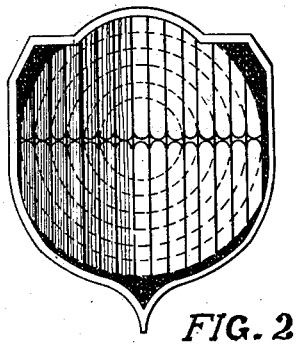
FIG. 22.
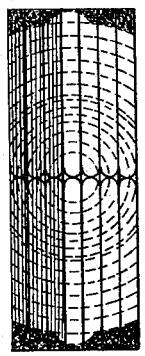
FIG. 30
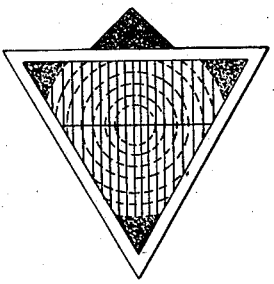
FIG. 23.
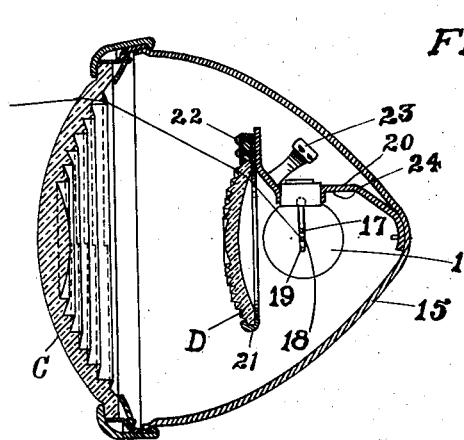
FIG. 25.
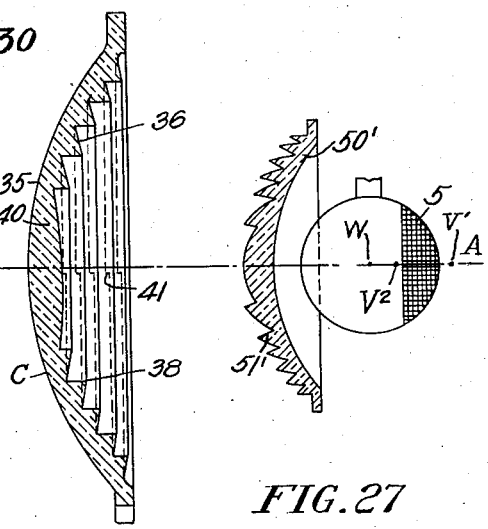
FIG. 27
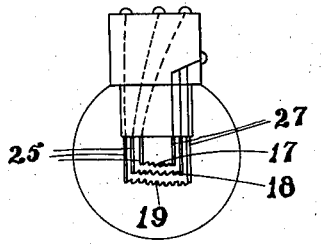
FIG. 26.
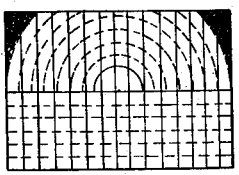
FIG. 31.
FIG. 29.
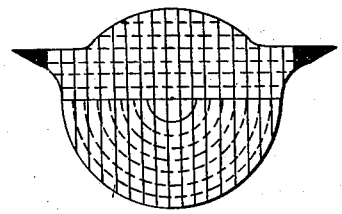
FIG. 28.
Inventor
GUSTAVE A. M. LAMBLIN-PARENT
BY
Attorney Patented Apr. 17, 1934

1,955,599

UNITED STATES PATENT OFFICE 1,955,599

MOTOR VEHICLE HEADLIGHT

Gustave Alphonse Marie Lamblin-Parent, Lille, France, assignor, by mesne assignments, to United States Holding Corporation, a corporation of Delaware Application July 30, 1931, Serial No. 554,111

6 Claims. (Cl. 240—41.3)

This application is a continuation in part of my applications, Serial Nos. 380,281, 414,749, and 428,876.

While my invention relates to light projectors, and will be of use for the many purposes to which such devices are put, for instance, the illumination of streets and highways, areas such as landing fields for aircraft, illumination of buildings and monuments, and other purposes, I have by way of illustration described the use of my invention as a motor vehicle headlight.

In my present invention, I utilize a forward lens of the Fresnel type, but of special construction, in which the steps of the upper and lower halves of the lens are of different curvatures, being separated along a line of abrupt shoulders, and having different focal regions, the forward lens being optically asymmetrical, and may beneficially combine with such lens a stepped condenser lens optically symmetrical, with a light source located behind the focal region of the system produced by the upper half of the asymmetrical lens and the condenser and in front of the focal region of the system produced by the lower half of the asymmetrical lens and the condenser.

I also provide the asymmetrical lens with vertical flutings, which are located on the portions of the lens desired, and various constructions, arrangements and locations of which are illustrated herein, to spread desired portions of the beam in order to obtain the distribution desired.

The top of the beam produced by the system has an extremely well defined and sharp horizontal cut-off, and the rays produced by the combination and issuing from the lower half of the forward lens will diverge from the axis, near which they are substantially parallel, outwardly as the borders of the lower half of the lens are approached, while the rays produced by the combination and issuing from the upper half of the forward lens will converge toward the axis and be projected into part of the beam formed by the lower half of the system, to produce a beam in which the light at and below the cut-off is more highly concentrated, diminishing in intensity toward the headlight and toward the side and lower portions of the beam. Also, with this system, the amount of light originating from the light source and projected by the system is materially increased over the amount of light which would be utilized in the absence of the stepped condenser. Thus, the invention not only improves the projected beam, so far as the shape thereof and the distribution of light therein are concerned, but also increases the total amount of light which is utilized.

I use, in connection with the system, a plural filament light source, the second filament of which is preferably located above the first, to be lighted when the first is extinguished, to thereby depress the beam to form a "dim" light on approaching vehicles or pedestrians coming from the opposite direction.

To produce improvements outlined above are the general objects of my invention. Further objects will become apparent as the description proceeds.

Figs. 10 to 21 inclusive represent face views of the lens, illustrating various arrangements of the fluting that may be used.

Figure 24:
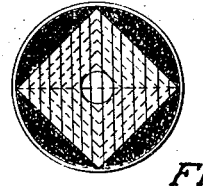

Figs. 22 to 24 inclusive represent face views of headlights illustrating the adaptability of the lens to headlight casings of different designs.

Fig. 25 represents a vertical sectional view through a headlight constructed according to my invention.

Fig. 26 represents an elevational view of a lamp which may be used.

Figure 1:
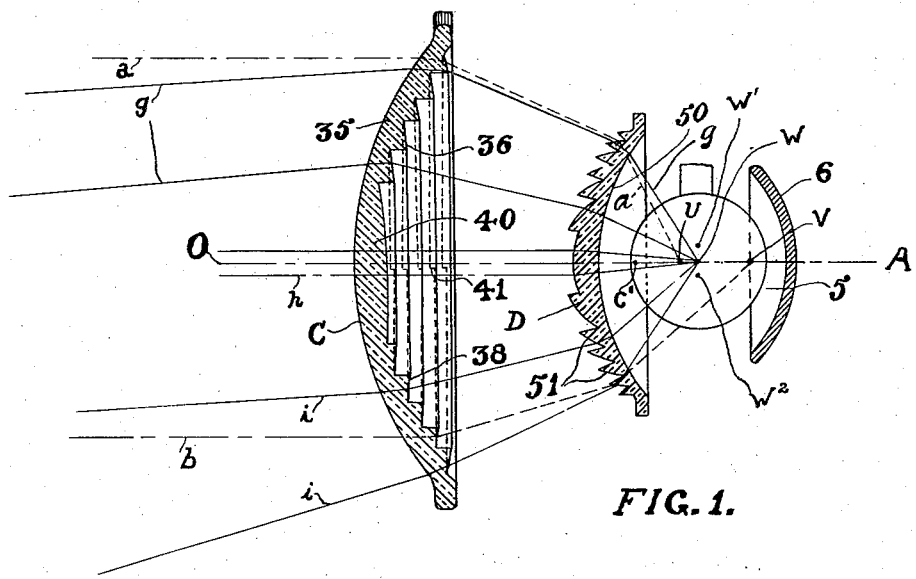
Fig. 1 represents a vertical sectional view through a system constructed according to my invention.

Figure 27 is a modified construction of the form shown in Figure 1.

Figures 28, 29, 30, 31 and 32 represent face views of modified forms of lenses.

Referring more particularly to the drawings, the forward lens C, considered alone, (see Fig. 2), which is in the general shape of a circular Fresnel, has a spherical front face 35, and on the upper half of its rear face is a series of substantially semi-circular refracting zones 36 and on the lower half another series of substantially semi-circular refracting zones 38, there being also provided a centrally located bull's eye 40. The refracting zones and the part of the bull's eye in the upper half of the lens and the zones and the part of the bull's eye in the lower half of the lens are separated along the lines of the abrupt shoulders 41, which extend substantially horizontally and diametrically of the lens across the zones thereof and the bull's eye. The inner corners 37 of the refracting zones of the lower half of the lens are continuous with those of the respective zones of the upper half of the lens, so that the separating shoulders merge with the surfaces at the inner corners 37. Beginning at the merging corners, the shoulders increase in width across the respective zones toward the outer edges thereof, following the increase in thickness of the lower zones radially of the lens over the upper zones, the shoulders thus being substantially triangular in shape, and being substantially horizontally disposed. On the bull's eye, the shoulders separating the upper and lower parts merge with the surface near the center of the bull's eye and increase in width toward the outed edges, following the increase in thickness of the lower half of the bull's eye toward its outer edges.

The refracting zones and the part of the bull's eye in the upper half of the lens have a common principal focal region at X, and are of such curvatures as to project into parallel rays the light originating at such focal region, the upper portion of the bull's eye and the zones being struck from centers c, along the optical axis O—A, forward of the lens, with increasing radii as the outer edge of the lens is approached. The lower zones and the lower half of the bull's eye have a common principal focal region at Y, disposed further from the lens than the focal region X, and are of such curvatures as to project, with increasing divergence away from the axis, rays originating at the focal region Y, the lower half of the bull's eye, like the upper half, having its inner face spherical, but being struck with a radius substantially three times as long. The faces of the lower zones may be segments of conic surfaces whose axes coincide with the optical axis of the lens. The dotted line e in Fig. 2 indicates the base of the generating triangle of one of the lower zones, the line d the hypotenuse, and the distance f along the optical axis indicates the altitude of the generating triangle. The angle opposite the axis for the zone shown, for instance, may be approximately 5°.

In the form of the forward lens shown in Fig. 3, the shape of the bull's eye is somewhat changed, the lower half having its principal focal point at Z, between the principal focal region X' of the upper part of the lens and bull's eye and the principal focal region Y' of the lower zones, and the radius of the upper part of the bull's eye is increased and is struck from a point below the optical axis. I also so shape the lower zones as to cause the light rays projected through them to cross each other, with the light projected through one of such zones overlapping that projected through adjacent zones. Such zones may, for instance, be struck from centers g' (Fig. 3), arranged at decreasing distances below the axis, and with decreasing radii as the outer edge of the lens is approached (except for the outermost zone), and with such exception being of cylindrical curvature of decreasing radii radially of the lens. The outermost zone is preferably struck with a somewhat longer radius than the next adjacent zone, to bring its projected light well to the edge of and define the lower section of the beam.

In this form of the invention, the upper zones merge with the respective lower zones at their outer edges, the thickness of the upper zones increasing from their outer edges inwardly with respect to the respective lower zones, and the abrupt shoulders 41' (Fig. 3) are reversed in position, being wider at the inner edges of the zones and narrowing towards their outer edges.

Figure 2:
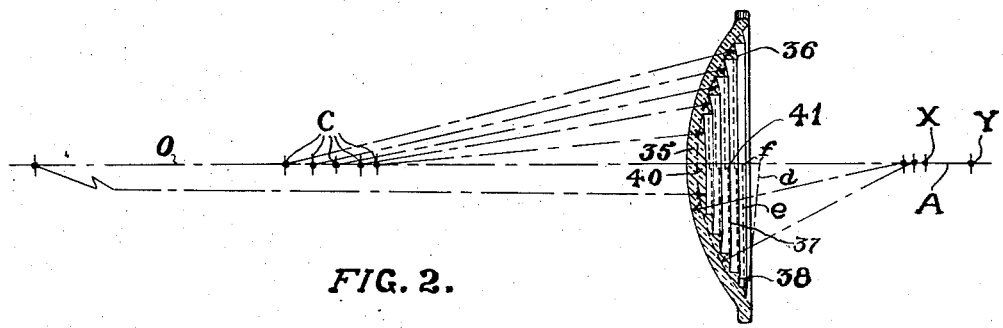
Fig. 2 represents a vertical section through the forward lens, showing the construction thereof.

In Fig. 1, I have shown, for purposes of illustration, the stepped condenser lens D combined with the form of the forward lens illustrated in Fig. 2, but it will be understood that such condenser may be likewise combined with the form of the lens shown in Fig. 3, as will be more fully dealt with hereinafter. The stepped condenser D, in the form of the invention shown, is optically symmetrical, having a spherical rear face 50, and being provided on its front face with the circular steps or zones 51. The latter should be struck with increasing radii toward the outer edge of the condenser, from a center such as c', to condense the light accepted by the condenser onto the lens C. The focus of the system formed by the upper half of lens C and the condenser will be at a point U, indicated where a ray a, parallel to the axis O—A of the system, incident on the upper lens half, crosses the axis after refraction by the lenses C and D, and the focus of the system formed by the lower half of lens C and the condenser will be at a point V, indicated where a parallel ray b, incident on the lower half of lens C, crosses the axis after refraction by the system. The light source W is preferably positioned between the foci, that is, at a point behind the focal point U of the system produced by the upper half of the asymmetrical lens C and the condenser D, and in front of the focal point of the system produced by the lower half of the asymmetrical lens C and the condenser.

With the elements of the system constructed and arranged as suggested, rays originating at the light source and projected by the system, comprising the condenser and lower half of the forward lens, will emerge as rays of increasing divergence away from the axis as the outer edges of the lower lens are approached, as indicated by the rays i, the rays emerging from near the central portion of the lower half of the bull's eye, being substantially parallel to the axis as at h, and the rays emerging from the outer portions of the last zone of the series on the lower lens half being of the greatest spread or divergence. While the rays emerging from the lower half of the bull's eye will begin to diverge as the outer edge thereof is approached, they will, due to the relatively long radius on which the inner face is struck, remain well concentrated, so as to intensify the central portion of the projected beam at and below the cut-off. The rays emerging from or projected by the system, comprising the condenser and upper half of the forward lens, will, except for the rays adjacent the optical axis, which will be substantially parallel thereto, converge toward the axis, as indicated by the rays g, to eventually cross the axis and merge at and below the horizontal cut-off with the rays projected by the lower half of the system, so that the light from the upper half will be superimposed on that projected from the lower half of the system to reinforce the intensity of the beam spot as a whole.

Figure 4:
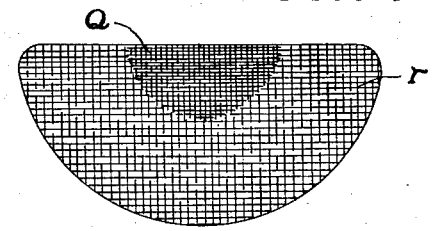
Fig. 4 represents a diagrammatic vertical sectional view on a small scale through the beam projected by the system of Fig. 1, taken at a distance from the system.

The resultant beam projected by this optical system, as indicated in Fig. 4, has a well defined horizontal cut-off at the top, produced by the abrupt termination of the elements of the lower lens half along a horizontal line and by the projection of the light from the upper half of the system onto that projected by the lower half. The beam has an area of high intensity in its central portion at and below the cut-off, as indicated at Q, such high intensity area being produced by the rays projected by the lower half of the bull's eye, with those projected from the upper half superimposed thereon. Such area decreases in intensity towards its edges, due to the divergence of rays projected from the edges of the lower bull's eye, and merges with the less intense area $r$ produced by the diverging rays projected by the lower half of the system. The area $r$, due to the increasing divergence of the rays as the edges of the lower lens half are approached, will decrease in intensity towards its borders.

Figure 6:
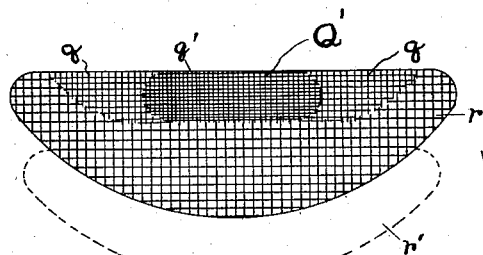
Fig. 6 represents a view similar to Fig. 4 illustrating the distribution secured by the fluting arrangement of Fig. 5.
Figure 7:
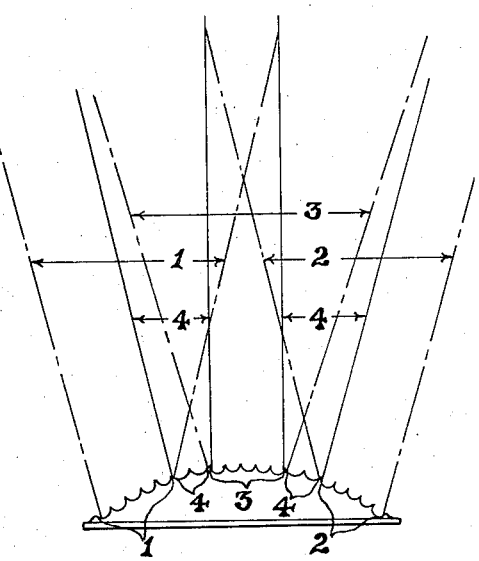
Fig. 7 represents a diagrammatic horizontal sectional view, also illustrating the distribution effected by the flutings.
Figure 8:
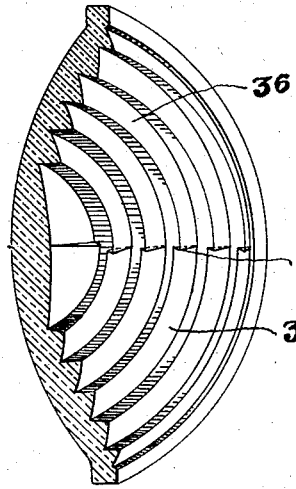
Fig. 8 represents a fragmentary perspective view through the lens illustrated in Fig. 3.

It is desirable that the area of high intensity be distributed across the beam and the beam as a whole be spread laterally and smoothed out. To accomplish this, I form the forward face of the lens C with vertical flutes of curvature and placement, such as to distribute the portions of the beam as desired, various arrangements and dispositions of such flutes being illustrated in the drawings. For instance, the lens may be provided on its forward face with the vertically extending, concave flutings illustrated in Fig. 5, in which the groups 1 and 2 at the sides and the group 3 in the lower central portion, and which covers the lower half of the bull's eye, are struck with shorter radii than the flutes of the remaining group 4. The groups 1, 2 and 3 will spread the rays passing therethrough into overlapping relationship with each other and with the rays passing through the remaining group, and the rays passing through each flute will be spread into overlapping relationship with those passing through adjacent flutes. The distribution of the light in the resultant beam is indicated in Fig. 6, in which the area of high intensity Q' is illustrated as being widened out as a whole, with the portions of it as at $q$ being widened by the portions of the flutes 3 covering the lower half of the bull's eye, over the central portion $q'$, which latter, nevertheless, is wider than the high intensity area Q of Fig. 4, due to the action of the flutes of group 4 occurring above group 3. The action of the flutes in distributing the light and smoothing the beam is also indicated in Fig. 7, which is a diagrammatic horizontal section taken below the center of the lens, and in which the various groups of rays are labeled in accordance with the groups of flutes from which they emerge. It will be understood that these illustrations of the beam are not intended to be accurate, being given for illustrative purposes.

It will be noted that the light source may be adjusted nearer to the focus of the upper half of the system and further from the focus of the lower half, and vice versa. The projection from the upper half will be thus widened and narrowed to be superimposed on the beam spot from the lower half higher up or lower down respectively, as desired, and the spread from the lower half of the system be increased or decreased. The projection from the upper and lower halves may thus be co-related to obtain the most desirable results, and to adjust the beam so that the maximum intensity of the beam as a whole will be distributed from the top at the cut-off downwardly to near the center. Further, due to the differences in the focal lengths of the upper and lower halves, the beam as a whole projected by the headlight is relatively insensitive to small displacements of the filament out of the desired focal position, so that inaccuracies of filament position relative to the lamp bases, occurring in manufacture, will have no material effect on the beam or the light distribution.

Figure 3:
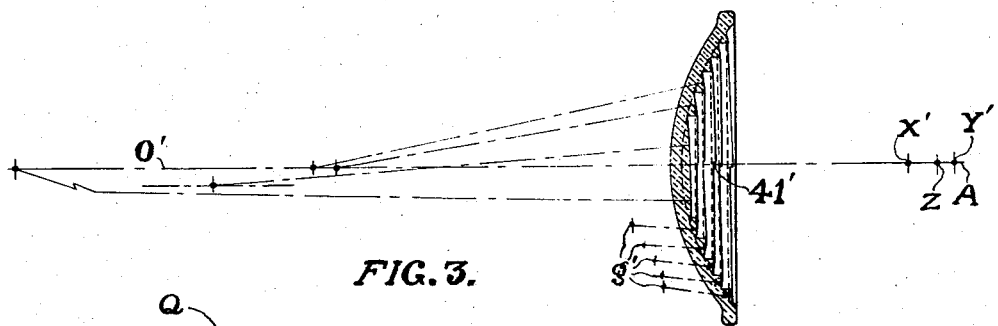
Fig. 3 represents a similar view of another form of lens.

From the foregoing, it is believed that the results produced when the condenser is used in a system with the form of lens shown in Fig. 3 will be understood without detailed description. Suffice it to say that the lower half of the bull's eye having its focal point nearer the light source in this form will project rays of somewhat less divergence than before, and the upper part of the bull's eye, being of increased radius, struck from below the optical axis, will project rays further down into the area of high intensity than before, and the curvatures given to the zones of the lower half of the lens will cause the rays from each of the lower zones to cross each other and overlap rays projected from adjacent zones to increase the uniformity of the light proceeding from the lower half of the system, at the same time retaining the spread or dispersion of the beam.

The principles of the system which have heretofore been described may be utilized where the condenser, as well as the forward lens, is asymmetrical. For instance, the lower half 51' of the condenser may have a longer focal length than the upper half 50', to give to the lower half of the system a longer focal length than where the condenser is symmetrical, to thus increase the spread or divergence of the beam projected by the lower half of the system. The focal point of the lower half will thus be shifted back to a point, say $v'$, (Fig. 27), or, with the focal length of the lower half of the condenser shortened, will be shifted forward to a point, say $v^2$, to thus decrease the spread. It will also be understood that the condenser may, if desired, be set in an inclined position, with its center on the optical axis, say with its top inclined forwardly, the effect of which would be to decrease the vertical depth of the beam with respect to its horizontal width.

It will also be noted that I contemplate the use of a lamp having a secondary filament placed above the main filament and the optical axis, as at W', to be lighted when the main filament is extinguished, to thus provide a "dim" light for use when approaching vehicles or pedestrians coming from the opposite direction. When the filament W' is lighted, the effect will be to depress the projected beam so as to shift the beam spot downwardly, as indicated at $r'$ (Fig. 6), i. e., on the roadway nearer to the headlight, and to prevent the possibility of any stray rays being projected upwardly. A third filament may be used, if desired, of low candle power and placed below the main filament, as at $W^2$, to be used for parking purposes. Also, if desired, though it is not necessary, the rear of the bulb within which the light source is positioned can be silvered, as indicated at 5 Figure 27, or leave the bulb transparent and use a spherical mirror at the rear thereof, as indicated at 6 Figure 1. In either event, light originating at the source will be projected back upon itself to reinforce the light collected by the condenser. This has no effect upon the optical characteristics of the headlight, merely increasing the amount of light used. The mirror will not reflect the light into a horizontal beam, such as is the effect of a parabolic reflector, for instance. In my headlight, I do not use a reflector to form and project the beam as in the ordinary headlight.

Bulbs, or lamps of standard candle power; for instance, 32 x 21, are contemplated for use in the headlight, and since a very large proportion of the total flux is utilized in the beam, particularly where the condenser is used, the beam is of high intensity and adequately illuminates the roadway.

In Fig. 25, I have shown the system mounted in a headlight casing 15, the lamp 16 including the three filaments 17, 18 and 19, and being supported in a bracket 20, with the central filament 18 arranged somewhat behind the focal point of the system produced by the upper half of the forward lens C, and the condenser D. The filaments 17 and 19 are arranged respectively above and below the filament 18. The latter is used for driving where the long range beam is desired. The filament 17 is used for the depressed beam or "dim" light, and filament 19, for parking. The condenser is carried in a ring 21 secured by screws or other fastenings 22 to the bracket. The latter is preferably of stamped metal and given the form of a tripod, the legs 23 being secured to the casing to thus rigidly hold the condenser and lamp in position. The middle leg of the tripod is bent downward to engage the casing at the apex of the latter and the side legs bent upwardly to space the central portion 24 of the tripod away from the casing and hold it in a substantially horizontal position to receive the socket of the lamp. The portion of the bracket between the forward legs is bent upwardly to form an anchorage for the fastenings 22. The filaments in this form of lamp are supported on separate leading-in wires or filament supports 25, with separate terminals, as indicated in Fig. 26, and may also have separate return supports 27 connected to a common terminal as shown.

The lenses may be used in a headlight in which the condenser is omitted, if desired, and the light source, or sources, located with reference to the focal region of the upper lens half in similar relationship to that which has been heretofore described concerning the location of the light source with reference to the focal region of the system produced by the upper half of the lens and the condenser, and a beam or beams of similar optical characteristics will be obtained. The amount of light comprising such beam or beams will, however, be less than where the concave stepped condenser is utilized.

Figure 9:
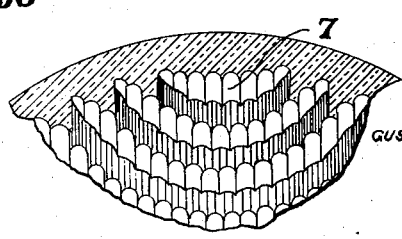
Fig. 9 represents a fragmentary horizontal perspective view through one of the lenses, illustrating the fluting arranged on the steps thereof.

The flutes, instead of being placed on the forward face of the lens, may be placed on the inner face thereof, upon the zones and/or bull's eye, as desired, as indicated at 7 in Fig. 9. Such flutes may be placed upon the chosen areas of the zones and/or bull's eye to spread the portions of the beam to obtain the lateral distribution wanted. While the flutes are shown in Fig. 9 of relatively narrow width, it will be understood that this is for illustrative purposes and that they are made of the proper width and radius of curvature. If desired, the fluting may be placed partially on the inside and partially on the outside of the lens.

In Figs. 10 to 21 inclusive, I have illustrated various arrangements that the flutings may take with reference to the lens.

Figure 10:
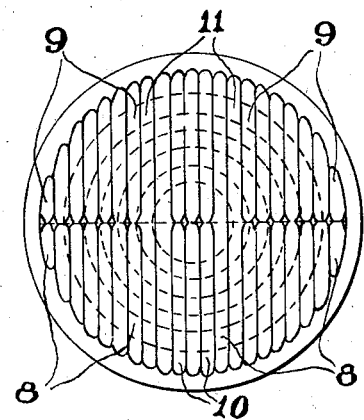

In Fig. 10, the flutes of the groups marked 8 at the sides of the lower lens half are of longer radius of curvature and of less dispersive power than the side groups 9 on the upper lens half thereabove, and those of the lower central group 10, which extend up to cover the lower half of the bull's eye, likewise are of shorter radius than those of group 8, and of group 11 above. The flutes of group 10 may, if desired, be of the same radius of curvature as those of group 9, and likewise those of group 8 may be of the same curvature as those of group 11. Side flutes of group 11 may extend down across the lower lens half to occur between groups 8 and 10.

Figure 11:
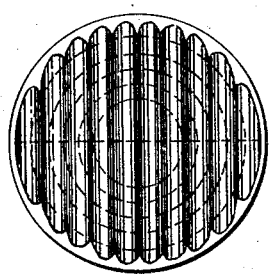

In the arrangement illustrated in Fig. 11, the flutes are continuous across the lens face, and preferably are of equal radii of curvature, or they may be of decreasing radii and increasing refractive power from the center outwardly, or of increasing radii and decreasing refractive power towards the sides of the lens.

Figure 12:
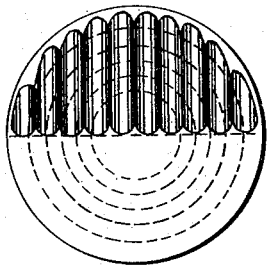
Figure 13:
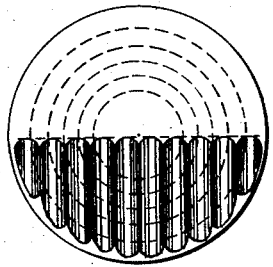

I have found that good results are obtained by the arrangement indicated in Fig. 12, wherein the upper half only of the lens is fluted. As in the case of Fig. 11, these flutes may be of equal radii of curvature, or of decreasing or increasing radii towards the sides, or arranged in groups of different curvatures. The arrangement illustrated in Fig. 13 opposite to that shown in Fig. 12, places the flutes on the lower half only of the lens.

Figure 14:
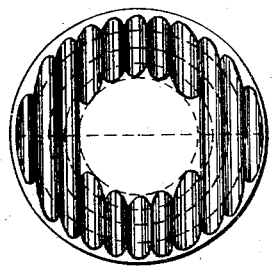
Figure 15:
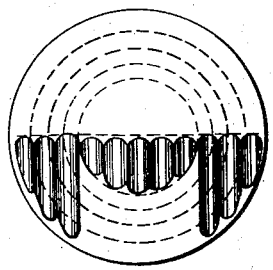
Figure 16:
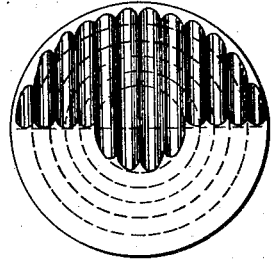
Figure 17:
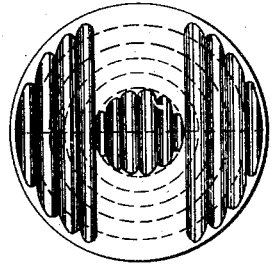
Figure 18:
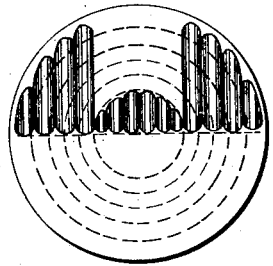
Figure 19:
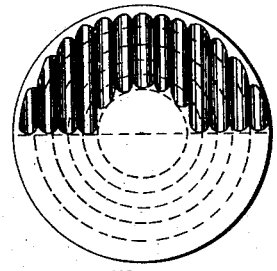
Figure 20:
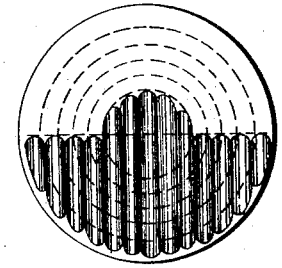
Figure 21:
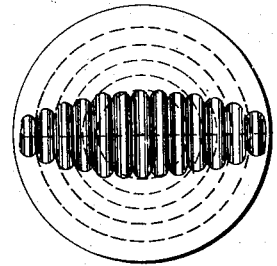

In Fig. 14, the lens, except for the bull's eye, is fluted, and the flutes may be arranged in groups of different curvature, or of the same or varying curvature, as heretofore discussed. In Fig. 15, the lower half of the bull's eye and the sides of the lower lens beyond the central portion are fluted, an arrangement opposite to that shown in Fig. 18, in which the upper half of the lens is similarly fluted. In Fig. 16, the bull's eye and the upper half of the lens are illustrated as being fluted, while, in Fig. 20, the bull's eye and the lower half of the lens are fluted. In Fig. 17, flutes occur across the bull's eye and on the upper and lower halves of the lens at opposite sides of the central portion thereof. The arrangement shown in Fig. 21 provides for the fluting of a central band transversely of the lens, the flutes covering the bull's eye and the central portions of the lens to the sides thereof.

Figure 5:
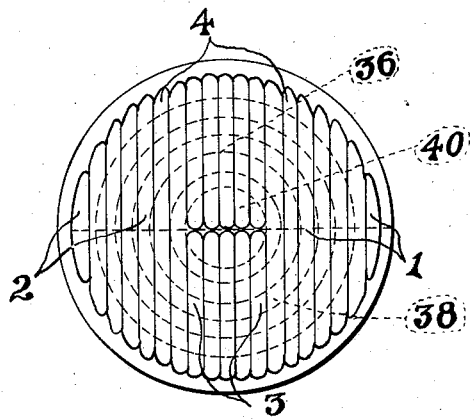
Fig. 5 represents an elevational face view of the forward lens, showing the arrangement of flutings thereon.

It is believed that the distribution of the light in the beam that may be obtained by these various arrangements of flutings will be understood without further description, in view of the detailed description which has already been given with reference to the arrangement of flutings shown in Fig. 5.

Figure 32:
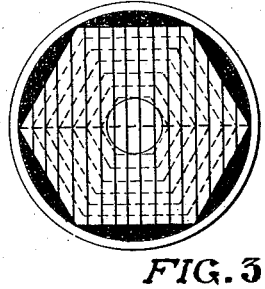

While the forward lens has been shown with the central bull's eye, it will be understood, without illustration, that the zones of the upper half of the lens or of the lower half, or of both, may be continued if desired to occupy the space on the lens illustrated as taken up by the bull's eye. I also shape the refracting zones in different ways and form the lens in different shapes, as shown in Figs. 28 to 32 inclusive. In Figure 32, there is shown a triangular-shaped lens with a bull's-eye centrally located therein, in which the stepped refracting zones, instead of being concentric, are of inverted V-shape in the upper half and of V-shape in the lower half, the zones ending abruptly along the horizontal central line of the lens, and the zones in the upper and lower half being constructed of different curvatures and being of different focal lengths, as hereinbefore described. In Fig. 28, the lower half of the lens has the concentric stepped refracting zones, and a semi-circular bull's eye, and the upper half of the lens is provided with parallel horizontally arranged stepped zones of different curvature than those of the lower half. The lens shown in Figure 31 is of rectangular shape in which the upper part is provided with stepped concentric refracting zones, and the semi-circular bull's-eye, while the lower half is provided with refracting zones which are parallel to the horizontally disposed dividing line of the lens, and which are of different curvature than the upper zones, and provided with a longer focal length. In Fig. 29, the lens is V shape in horizontal section and the refracting zones in the upper and lower halves decrease in length toward the top and bottom, and in Fig. 30 the zones in the upper and lower halves are of semi-hexagonal form. In each of the designs illustrated to show that the lens and its zones may assume various forms, the upper and lower sections are constructed with different focal lengths, and the refracting zones of the upper and lower halves are of different curvatures.

Since no focusing reflector is used in my headlight, such as is ordinarily used, which itself reflects the lights from the source and projects it into a bundle of substantially parallel rays, the headlight will accommodate itself to various shapes, so that many different designs and profiles of lamp casings may be used. For instance, in Fig. 22, the lens is of V type or shape in horizontal section from the outside and shows a front view of a headlight casing having the profile of a shield in which a lens constructed according to my invention, having a similar profile, is mounted. In Fig. 23, a triangular headlight and lens are shown, and in Fig. 24 a diamond shape. These are merely illustrative of the many forms to which the headlight may be accommodated.

All the lenses described in this application can be made in any shape desired and consequently could be made of V shape.

From the foregoing, it will be observed that the headlight I provide, while doing away with the reflector ordinarily used for forming and projecting the beam, and likewise eliminating the cost of the reflector, and the gradual diminution of light due to the reflector becoming dusty or tarnished, and while doing away with the disadvantages of the sensitiveness of the reflector, at the same time utilizes a large percentage of the light flux from the light source, and produces a beam for ordinary driving purposes which is brilliant and non-glaring, and which has a distinct top cut-off, and in which the light is properly distributed, and also produces, when a "dim" light is desired, a beam which is depressed below the ordinary driving beam, and which will prevent the possibility of any stray upward rays. The beams in both instances are of sufficient horizontal and vertical angular width to adequately illuminate the roadway and adjoining sidewalks or gutters.

While the foregoing detailed description has been given for purposes of illustration of the invention, it will be understood that no undue limitations should be deduced therefrom, but that variations in the construction, combination and arrangement of parts, and the uses to which the invention may be put, may be made within the range of equivalents to which the invention is entitled, without departing from the scope of the claims.

While this application discloses subject-matters in part common to my before mentioned applications, I am claiming in this application, matters not claimed in my said other applications, the common subject-matter in general being claimed in said other applications.

I claim:

1. In a light projector, the combination of an optically asymmetrical lens having upper and lower sections, each formed with refracting zones of varying curvature, the upper section having a focal length different from that of the lower section, the curvature of the zones of the one section differing from the curvature of the zones of the other section, and a concave stepped condenser forming with the asymmetrical lens a system in which the focal length of the upper section of the system is different from the focal length of the lower section of the system.

2. In a light projector, a modified Fresnel lens having upper and lower sections, each formed with refracting zones of varying curvatures, the upper section having a focal length different from that of the lower section, the curvature of the zones of one section differing from the curvature of the zones of the other section, a light source in the horizontal line of the foci of the sections, a second light source above said line, and a third light source below said line.

3. In a light projector, a unitary modified Fresnel lens, the upper part of which above the horizontal axial plane has a shorter focal length than the lower part below said plane, said lens having refracting zones with the refracting zones of the upper part varying in curvature with respect to each other and with respect to the refracting zones of the lower part, a light source positioned in the region of the foci, and vertical fluting on the same side of the lens with the refracting zones.

4. In a light projector, a modified Fresnel lens having an upper section and a lower section, the lower section being formed with refracting zones differing in curvature with respect to each other, the upper section of the lens being formed with refracting zones differing in curvature with respect to each other and to the zones of the lower section, each zone being of uniform refractive power, the lens being formed with flutings having different radii for areas on the central and side portions of the lens.

5. A lens system comprising the combination of an optically asymmetrical lens having upper and lower sections, the upper section having a focal length different from that of the lower section, the zones of the upper section differing in curvature from the zones of the lower section, and an asymmetrical condenser having for its upper section a different focal length than for its lower section, and forming with said lens a system in which the focal length of the upper section of the system is different from the focal length of the lower section of the system.

6. In a light projector, the combination of an optically asymmetrical lens having upper and lower sections provided with zones, the zones of the upper section differing in curvature from the zones of the lower section, the focal length of the upper section differing from that of the lower section, an asymmetrical condenser associated with said lens and having for its upper section a different focal length than for its lower section, and a light source in the region of the foci of the system produced by said lens and said asymmetrical condenser.

GUSTAVE ALPHONSE MARIE
LAMBLIN-PARENT.